July 18, 1939.   H. G. WORM   2,166,778
ELECTRIC OVEN
Filed June 10, 1938

INVENTOR
H. G. Worm
BY
ATTORNEY

Patented July 18, 1939

2,166,778

UNITED STATES PATENT OFFICE 2,166,778

ELECTRIC OVEN

Herman G. Worm, Sacramento, Calif.

Application June 10, 1938, Serial No. 212,989

5 Claims. (Cl. 219—35)

This invention relates generally to an electric oven, and in particular the invention is directed to an electric oven especially designed for use in the meat packing industry to cook molded meat products such as meat loaf, hams, corned beef, lunch meats, bologna and the like. At present such meat products are cooked in boiling water and the cooking process takes several hours.

It is therefore the principal object of this invention to provide an electric oven for cooking such molded meat products; the oven being arranged to effect exceedingly rapid as well as even cooking of the material therein.

An additional object is to provide an electric oven, for the above purpose, which includes a chamber having spaced electrode plates therein, the meat to be cooked extending between and engaging said plates whereby to complete or close an electric circuit therebetween. Thus, in my improved oven, the passage of electric current through the meat produces a heat therein and cooks the meat.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
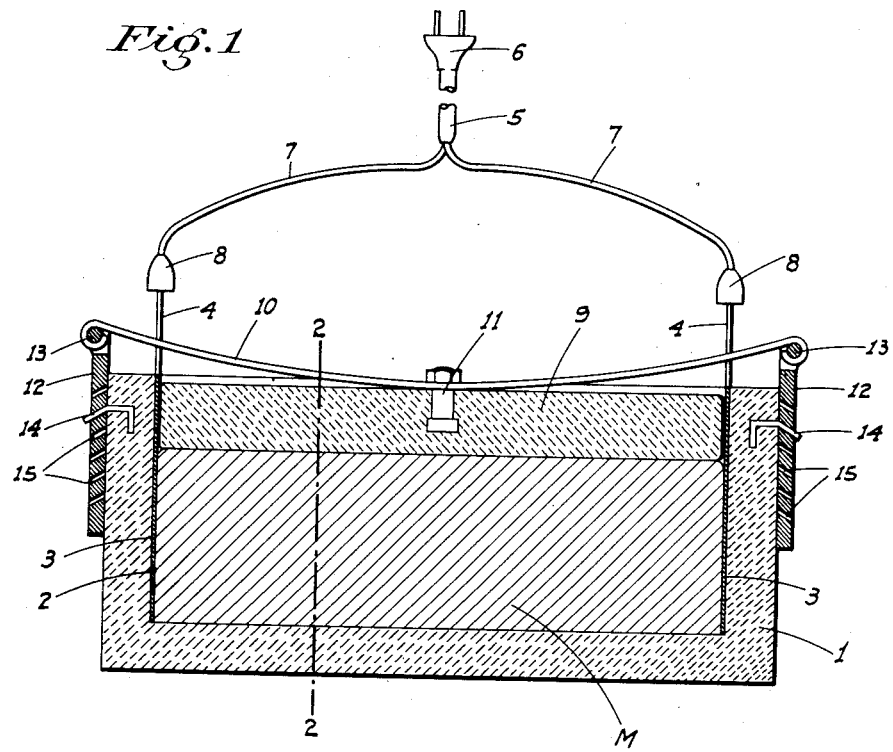
Figure 1 is a sectional elevation of the oven as in use.
Figure 2:
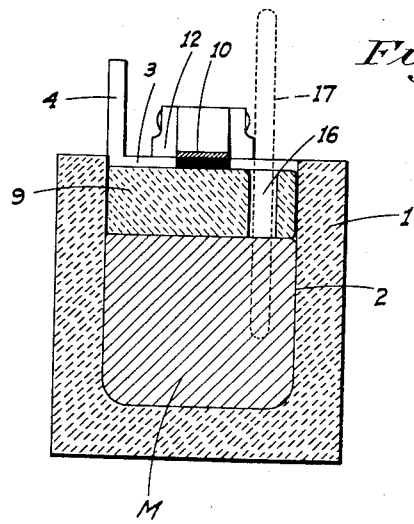
Figure 2 is a cross section on line 2—2 of Fig. 1.
Figure 3:
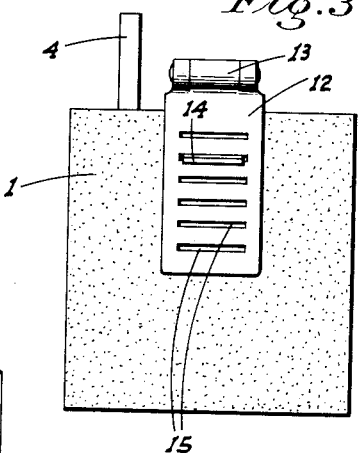
Figure 3 is an end view of the device.
Figure 4:
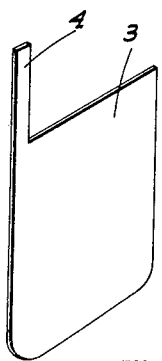
Figure 4 is a perspective view of one of the electrode plates.

Referring now more particularly to the characters of reference on the drawing, the numeral 1 designates an initially open topped case or container having a substantially rectangular trough or chamber 2 therein.

A flat electrode plate 3 is disposed in each end of the trough in face to face relation therewith; the plates being of substantially the same size and configuration as the chamber ends against which they rest. Each plate includes a terminal post 4 which projects upward from the plate adjacent one side thereof. An electric supply cord 5 includes a plug 6 on one end while at the other end of the cord the wires 7 are separated and each carries a socket 8 arranged to detachably engage with one of the electrode plate terminal posts 4.

The molded meat M to be cooked is placed in the chamber 2 between and engaging electrode plates 3; the meat being compressed in the chamber by means of a presser bar 9 disposed in the chamber with a close running fit. In order to exert a downward pressure on the bar, a semi-elliptical spring 10 is mounted on the bar, centrally of the ends of both, by means of bolt 11; the end portions of the spring extending at an upward slope to a termination above and somewhat beyond the ends of the case. Flat catch plates 12 are pivoted at their upper ends on the outer ends of the spring, as at 13, and depend in face to face relation with said case ends. An ear 14 projects outwardly from each end of the case and at a downward slope for selective engagement in any one of a plurality of transversely extending, longitudinally spaced slots 15 cut in the adjacent catch plate 12. These slots 15 are cut at an angle to correspond to the slope of ears 14. By placing the spring 10 under tension and then engaging the catch plates with ears 14, the bar 9 exerts a continuous pressure on the meat M in the chamber.

The case 1 and bar 9 are of dielectric and refractory material, such as concrete or terrazzo, and the surface exteriorally and interiorally is smooth to facilitate cleaning, removal of the cooked product etc.

In use when the meat has been placed in the case and is under the pressure of the bar 9, plug 6 is inserted in a receptacle and current passes through a circuit including the electrode plates 3 and the meat between and engaging said plates. The meat thus forms a portion of the circuit; the juices of such meat being a conductor. However, the resistance to the current causes the meat to heat up and in a short time the heat increases to sufficient temperature to thoroughly and evenly cook the product. With ordinary products, the meat is cooked in five or ten minutes; the interior of the meat reaching a temperature of 165° F. or higher in such time. The bar 9 is provided with an opening 16 through which a thermometer 17 may be inserted into the meat during the cooking operation.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. An electric oven comprising an initially open topped case, a presser bar slidably disposed in the case from its open end, the case and bar being of dielectric material, a semi-elliptical spring secured intermediate its ends on the presser bar, catch means for connection between the ends of the spring and case to place the spring under tension, and a pair of electrode members disposed in the case at opposed extremities thereof and arranged for connection with separate circuit wires; the material to be cooked being adapted to be placed in the case under the presser bar and between and engaging the electrode members whereby to complete the circuit therebetween.

2. A device as in claim 1 in which the ends of the spring extend beyond the case, said catch means comprising a catch plate pivoted on and depending from the end of each spring, each plate having a plurality of longitudinally spaced openings therethrough, and an ear mounted on the case adjacent each catch plate and arranged for selective engagement in one of the openings of said plate.

3. A device as in claim 1 in which the ends of the spring extend beyond the case, said catch means comprising a catch plate pivoted on and depending from the end of each spring, each plate having a plurality of longitudinally spaced openings therethrough, and an ear mounted on the case adjacent each catch plate and arranged for selective engagement in one of the openings of said plate; the openings in the plates diverging relative to the case and in a direction from their inner ends away from the pivoted ends of the plates, the ears diverging correspondingly.

4. An electric oven comprising an initially open topped case, a presser bar slidably disposed in the case from its open end, the case and bar being of dielectric material, means to exert an inward pressure on the bar and a pair of electrode members disposed in the case at opposite ends thereof and arranged for connection with circuit wires; the electrode members comprising flat plates disposed in the case between the ends of the presser bar and adjacent ends of the case; each plate including a flat terminal post projecting upward above the case, the presser bar thus being removable from the case without interference by said plates and posts.

5. An electric oven comprising an initially open topped and elongated case, a pair of electrode plates in the case and engaged in face to face relation with the end walls thereof, a presser bar slidable in the case, the electrode plates being disposed between the ends of the presser bar and said end walls, a longitudinally extending semi-elliptical spring secured intermediate its ends on the presser bar, said spring being of less width than the presser bar and extending at its ends over the ends of the case, and catch means for connection between the ends of the spring and case whereby to hold the spring under tension; each electrode plate being formed with a terminal post projecting upward therefrom and disposed in a plane to one side of said spring and adapted for connection with one of a pair of separate circuit wires.

HERMAN G. WORM.